(12) United States Patent
Broussard

(10) Patent No.: US 6,203,255 B1
(45) Date of Patent: Mar. 20, 2001

(54) FLOWER LIKE ROSETTE CUTTING DEVICE

(75) Inventor: Dwayne J. Broussard, Patterson, LA (US)

(73) Assignee: Southern Quality Designs, Inc., Patterson, LA (US)

( * ) Notice: Subject to any disclaimer, the term of this patent is extended or adjusted under 35 U.S.C. 154(b) by 0 days.

(21) Appl. No.: 09/468,593

(22) Filed: Dec. 21, 1999

Related U.S. Application Data

(63) Continuation-in-part of application No. 09/163,989, filed on Sep. 30, 1998, now Pat. No. 6,003,571.

(51) Int. Cl.[7] .................. B23D 7/08; B27C 5/00
(52) U.S. Cl. .............. 409/226; 144/135.2; 144/137; 144/144.1; 144/154; 144/154.5; 144/371; 144/364; 144/380; 144/241; 144/286.5; 409/221; 409/229
(58) Field of Search .................. 144/241, 134.1, 144/135.2, 137, 144.1, 154, 145.2, 154.5, 253.1, 253.5, 371, 372, 286.5, 364, 380; 269/55, 56, 57, 64, 67, 58, 63, 240, 244, 247; 409/165, 175, 178, 198, 226, 229, 221

(56) References Cited

U.S. PATENT DOCUMENTS

| | | |
|---|---|---|
| 2,581,415 | 1/1952 | Hull . |
| 2,787,175 | 4/1957 | Schurger . |
| 3,380,322 | 4/1968 | Brault . |
| 3,673,920 | 7/1972 | Whalen et al. . |
| 4,050,355 | 9/1977 | Niskanen . |
| 4,299,263 | 11/1981 | Skinner . |
| 4,305,439 | 12/1981 | Skinner . |
| 4,319,615 | 3/1982 | Ditmanson . |
| 4,327,786 | 5/1982 | Markkula . |
| 4,872,792 | 10/1989 | McCubbin . |
| 5,158,125 | 10/1992 | Edwards . |
| 5,271,441 | 12/1993 | Gakhar et al. . |
| 5,586,591 | 12/1996 | Gaydos . |

Primary Examiner—W. Donald Bray
(74) Attorney, Agent, or Firm—Garvey, Smith, Nehrbass & Doody, LLC

(57) ABSTRACT

A router guide apparatus for use in forming rosette designs in a work piece includes a frame having a work surface with a wheel rotatably mounted upon the work surface. The wheel has a plurality of position stops. The rosette design can be formed in a synthetic material (eg. Corian®) and filled with a filler or glue or settable material of a different color to form an inlaid design. The frame includes an adjustable guide for holding and a tracking a router with a cutting blade. The frame includes stops for limiting movement of the router during use. The guide and stops are configured to enable the cutting blade to cut two petals of a rosette design in a single pass. Inserts (fence blocks and/or router filler blocks) can be added to vary the position tracked by the router. The wheel is affixable into multiple angular positions relative to the guide so that multiple cuts can be made at different angular orientations relative to one another.

32 Claims, 12 Drawing Sheets

FLOWER LIKE ROSETTE CUTTING DEVICE

CROSS-REFERENCE TO RELATED APPLICATIONS

This is a continuation-in-part of U.S. Ser. No. 09/163,989, filed Sep. 30, 1998, and entitled "Flower Like Rosette Cutting Device" now U.S. Pat. No. 6,003,571.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a flower like rosette cutting devices and more particularly to an improved router guide apparatus for use in forming rosette patterns in a wooden or fabrication like work piece. Even more particularly, the present invention relates to a router guide apparatus for use in forming flower like rosette patterns in a wooden or like work piece using a frame having an adjustable guide that includes a side fence for tracking the router along a selected path and adjustable stops for determining the ends of the router path, and wherein the stops are positioned at opposite sides of a rotatable wheel that holds the work piece so that the router can cut through the center of rotation of the wheel and on both sides thereof in a single cut. The wheel is then adjustably moved into different angular positions so that each cut forms two petals of the rosette pattern.

2. General Background of the Invention

Flower like or rosette patterns are typically used in architectural aspects of buildings such as in the mill work of the interior of homes.

Various mill working devices have been patented that utilize rotary members that rotate relative to fixed base members that carry a work piece. Some of these woodworking devices cut flower or rosette patterns. An example is U.S. Pat. No. 4,305,439, issued to Charles Skinner and entitled "Woodworking Fixture". The Skinner '439 patent discloses a woodworking fixture for positioning and guiding a work piece under a stationary routing head, whereby the work piece is subject a composite movement as it progresses under the routing head. The fixture comprises an indexing table having a clamp for securing the work piece thereon, mounted on a moveable carriage. The indexing table can be slanted at an adjustable angle and may be routed as the carriage progresses under the routing head in order create designs of varying depth into the work piece. FIGS. 8 and 9 of the Skinner '439 patent show flower or rosette designs having petals cut into a wooden work piece.

Other types of fixtures for holding wood are shown in various U.S. patents wherein a rotary table is employed. These includes for example U.S. Pat. No. 2,581,415, entitled "Saw-Setting Machine"; U.S. Pat. No. 2,787,175, entitled "Rotary Machine Tool Table"; U.S. Pat. No. 3,380,322, entitled "Angular Work Indexing Table"; and U.S. Pat. No. 3,673,920, entitled "Apparatus for Cutting Slots or Grooves in Punch Support Plates or the Like".

U.S. Pat. No. 4,050,355 discloses an indexing device for indexing a member, such as a table, into operative work positions in which the table carries follower elements, such as rollers, and cooperating therewith is a drive member mounted on a pair of parallel equal length arms which rotate in unison thereby causing the drive member to take an orbital path. The drive member is slotted and during travel along the orbital path. The drive member is slotted and during travel along the orbital path picks up one of the followers on the table and therethrough causes the table to carry out an indexing movement. The indexing movement of the table is smooth and does not involve movement of the table at excessive speeds.

U.S. Pat. No. 4,327,786, entitled "Work Fixture" discloses a fixture for providing positive control over a work piece as it is being acted upon by a cutting or finishing tool. A base having a flat working surface is provided with a fixed guide member having a contoured control surface formed along the periphery thereof. A work holder is slidably supported upon the working surface of the base and is arranged to move in abutting contact against the control surface of the guide whereby a prescribed motion is imparted to a work piece supported in the holder. In one form of the invention, the work holder is mounted upon a turntable that is rotatably supported in a circular guide whereby the work is caused to rotate about a fixed axis.

A pistol grip checkering device is disclosed in U.S. Pat. No. 4,872,792. Also disclosed is pistol grip checkering method, device and product having mill cuts both laterally and longitudinally on the convex face of a pistol grip frame. The cuts are precisely cut by milling machine. A rotatable holder is provided which is pivotable about an axis and which holds the pistol frame to be checkered, such as with a protruding male member inserted into the ammunition magazine receiving chamber within the grip. A supporting surface is provided which is oriented at an angle greater than 90 degrees with respect to the axis and which supports the pistol grip frame. Indexing means are provided to incrementally index the rotatable holder about the axis to provide for successive longitudinal cuts on the convex face of the pistol grip frame.

A carving jig is the subject of U.S. Pat. No. 5,158,125. The carving jig is provided with a base having a bearing in which a projecting spindle is journalled for rotation, the spindle having facilities to allow a work piece to be attached, either directly or through the provision of an intermediate chuck, the jig also having a flat mounting surface which is normal to the axis of the spindle rotation, and the spindle having an indexing disc attached to it, so that is can be rotated in increments, but restrained against rotation during carving.

The present invention provides a simplified apparatus for guiding a router during the forming of a rosette design or flower design or like pattern in a piece of wood or other fabrication like materials.

BRIEF SUMMARY OF THE INVENTION

The present invention is an improvement over prior art devices because it is simpler, easier to use, and less complex while having different design capabilities.

The apparatus of the present invention includes a frame having a work surface, a wheel rotatably mounted upon the work surface, and where in the wheel has a center of rotation and a holder for supporting a work piece thereon.

The wheel provides a plurality of position stops thereon for affixing the wheel into various positions relative to the frame during use.

The frame includes an adjustable guide for housing and tracking a router with a cutting blade.

The frame includes stops for limiting movement of the router during use. The guide and stops are configured to enable the cutting blade to cut two petals of the rosette or flower design at a time in a single pass.

The wheel is affixable into multiple angular positions relative to the guide, so that multiple cuts can be made at different angular orientations relative to one another for forming the various petals of the design of the flower or rosette pattern.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
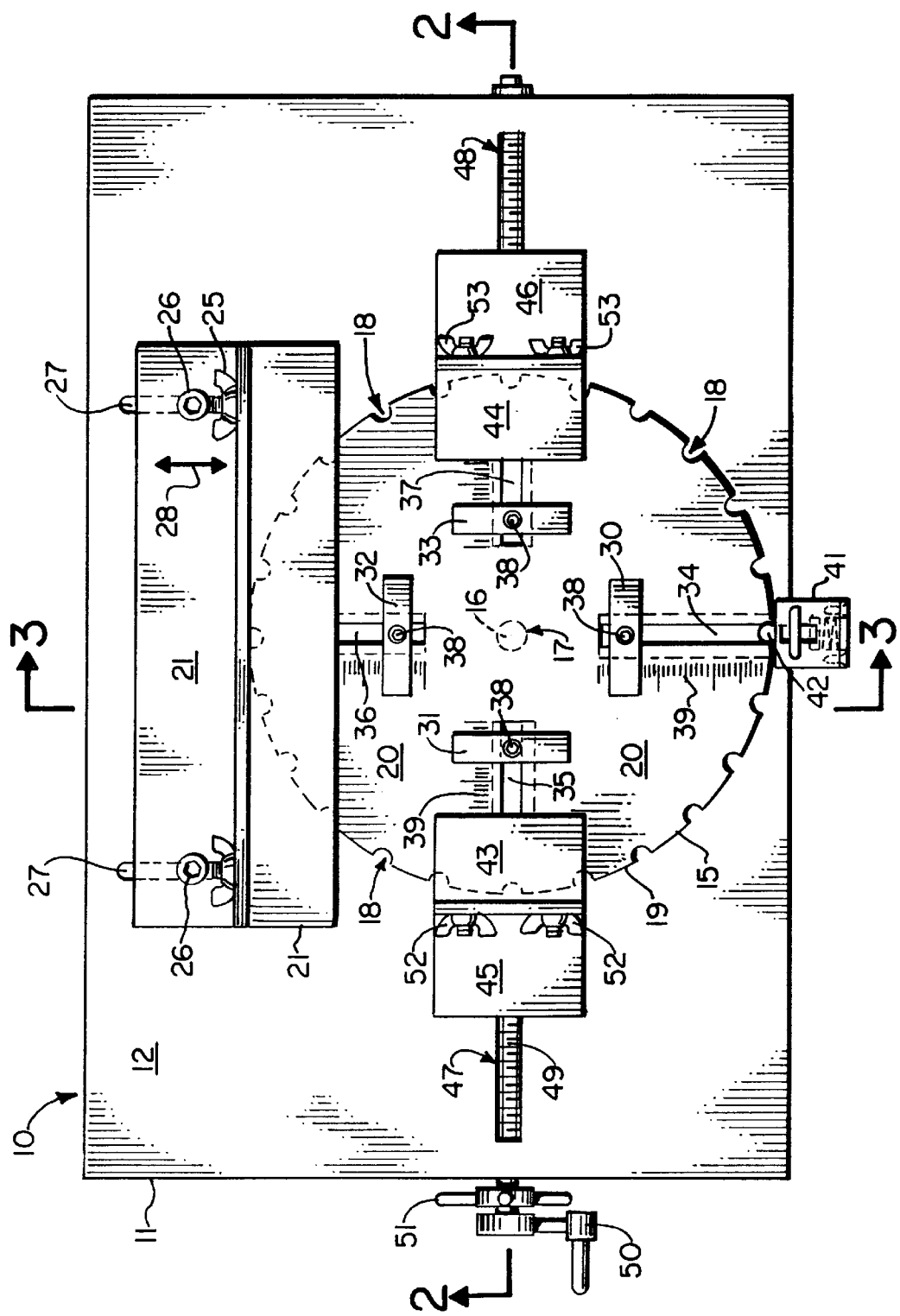
FIG. 1 is a top plan view of the preferred embodiment of the apparatus of the present invention.

FIGS. 1–5 and 8 show generally the preferred embodiment of the apparatus of the present invention designated generally by the numeral 10. Rosette cutting apparatus 10 includes a frame 11 having a work surface 12 thereon. Frame 11 can also provide a plurality of feet 13 for supporting the frame 11 and its work surface 12 above an underlying surface 14 such as a table top, counter or the like.

Turntable 15 is rotatably mounted upon work surface 12. The turntable 15 includes a hub 16 for rotating the turntable upon the frame 11 about the center of rotation 17.

The periphery of table 15 provides a plurality of grooves that are spaced circumferentially about the turntable 15, preferably about 15 degrees apart. Thus, a total of about 24 grooves 18 are provided in the preferred embodiment.

Figure 6:
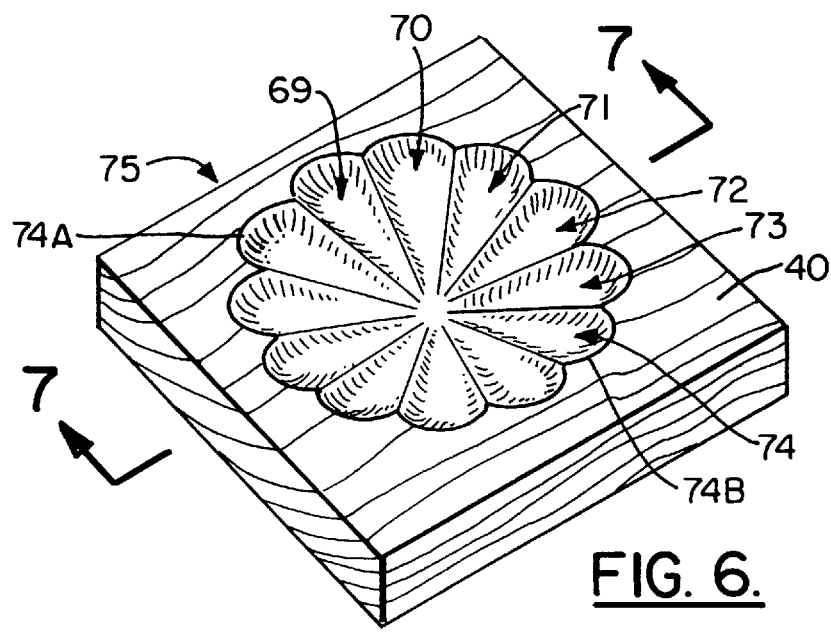
FIG. 6 is a perspective view of a wooden work piece with the flower or rosette after being cut using the apparatus of the present invention.
Figure 7:
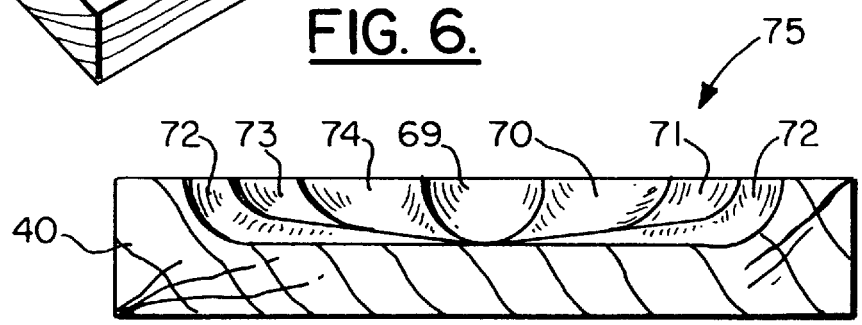
FIG. 7 is a sectional view taken along lines 7—7 of FIG. 6.

Turntable 15 provides an upper surface 20 upon which a work piece 40 can be placed so that a rosette or flower pattern can be cut therein, the final rosette pattern being shown in FIG. 6. The work piece 40 can be of wood, particle board, filter board, plastic or any one of many synthetics that are commercially available such as Corian®.

A guide arrangement is provided for guiding a router 60 during the cutting of grooves 69–74 in the work piece 40. The fence 21 includes flanges 22, 23 and beam 24. Bolted connections 25, 26 enable the flanged portions 22, 23 to be moved relative to work surface 12. Similarly, bolted connections 25 enable beam 24 to be moved into different elevational positions relative to work surface 12 as shown by arrow 29 in FIG. 3. Bolted connections 26 secure fence 21 to frame 11 in an adjustable fashion as shown by arrows 28 in FIG. 1. Slots 27 enable bolted connections 26 to pass though frame 11 in FIGS. 1 and 4.

Figure 4:
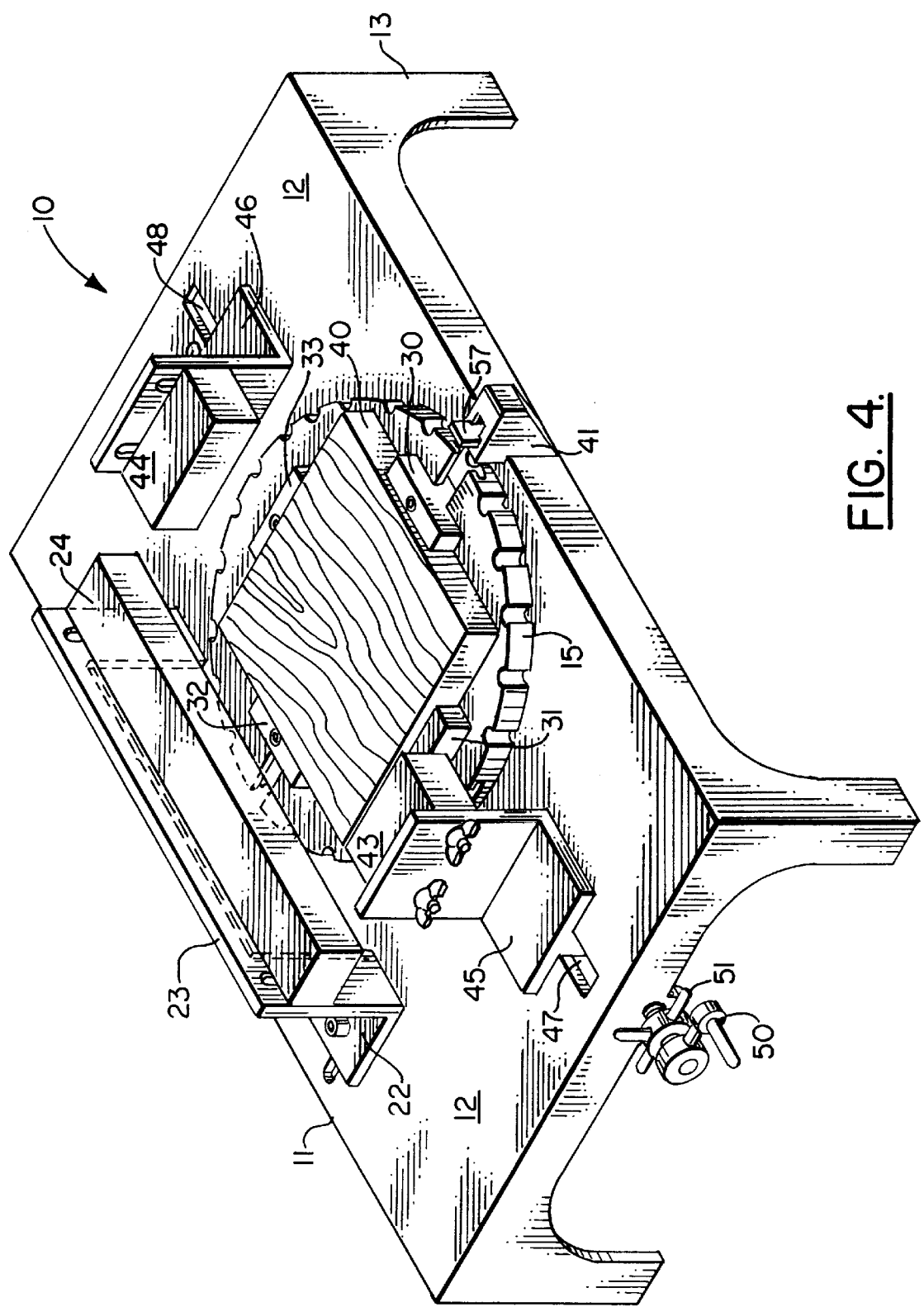
FIG. 4 is a perspective view of the preferred embodiment of the apparatus of the present invention.

A plurality of clamps 30–33 are provided for holding a wooden work piece 41 as shown in FIGS. 1 and 4. Each of the clamps 30–33 rides in a slot 34–37 respectively, being bolted to frame 11, each clamp 30–33 being attached to frame 11 at bolted connections 38 as shown in FIG. 1.

The turntable 15 is rotatable into different angular orientations relative to work surface 12 using detent locking mechanism 41 having locking pin 42. As shown in FIG. 1, the locking pin 42 registers in a selected of the grooves 18 in order to affix rotation of the turntable 15 relative to work surface 12.

Figure 2:
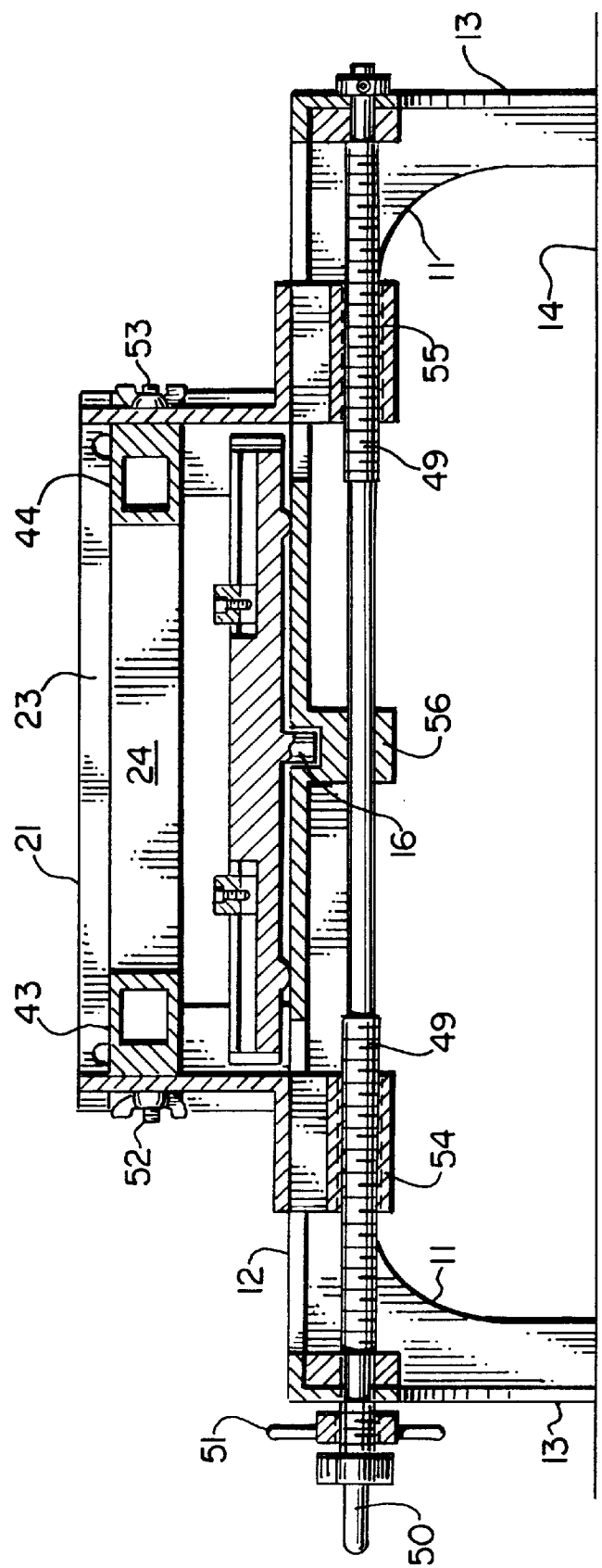
FIG. 2 is a sectional view taken along lines 2—2 of FIG. 1.
Figure 3:
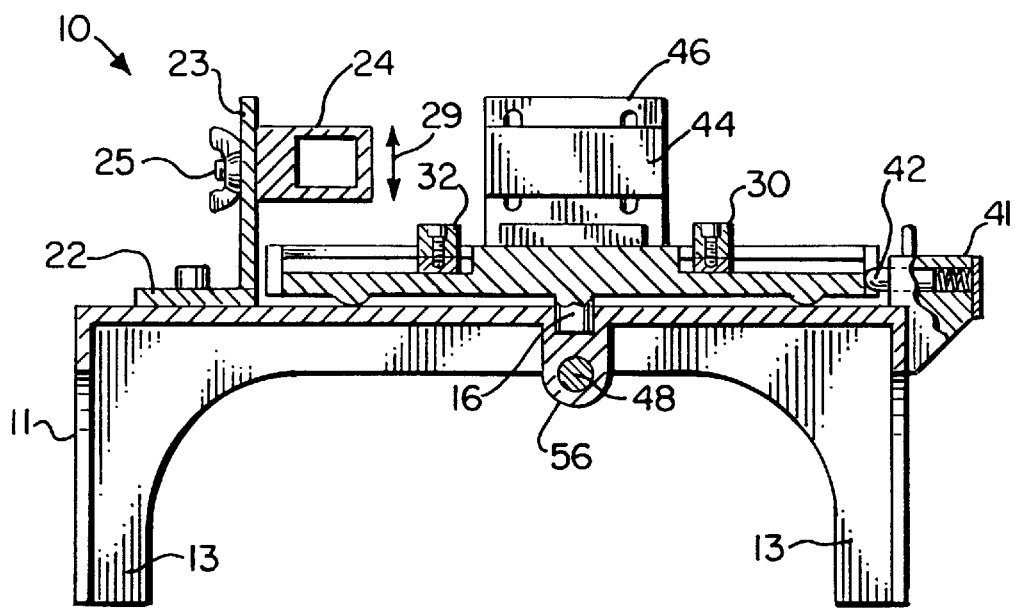
FIG. 3 is a sectional view taken along lines 3—3 of FIG. 1.
Figure 8:
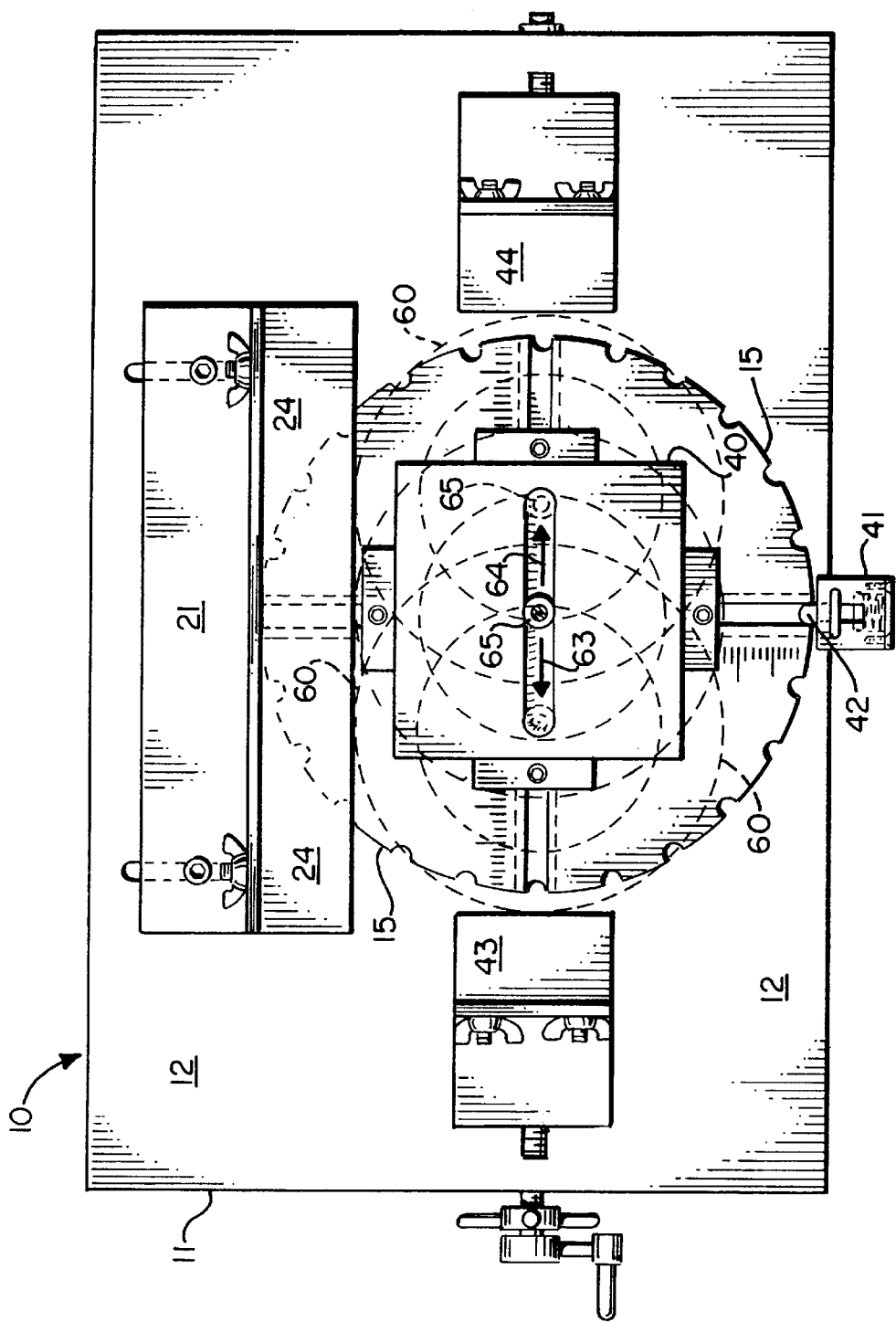
FIG. 8 is a plan view of the preferred embodiment of apparatus of the present invention showing movement of the router relative to the apparatus during the cutting of a double petal of a rosette or flower pattern.

A pair of opposed router stops 43, 44 are used to define the limit of movement of router 60 during the formation of a groove 69 as shown in FIGS. 1 and 8. The router stops 43 and 44 include flanged beam portions 45, 46 respectively that are mounted in slots 47, 48 respectively. Threaded shaft 49 extends under work surface 12 as shown in FIGS. 1, 2 and 3. Thread shaft 49 is rotated with crank 51. The shaft 49 can be affixed in a selected position using lock wheel 51 that is rotated to engage frame 11 so that the crank 50 cannot be rotated to move the shaft 49.

Bolted connections 52, 53 attach each of the stops 43, 44 respectively to their respective flanged beam portions 45, 46 as shown in FIGS. 1, 2 and 4.

Threaded shaft 49 is supported by internally threaded sleeves 54, 55 and shaft support bearing 56. The sleeves 54, 55 are attached to and a part of each of the flanged beams 45, 46 so that when the shaft 49 is rotated, flanged beams 45, 46 move together or apart. This is caused by changing the thread patterns at sleeve 54 and at sleeve 55 so that when the crank 50 is rotated, the flanged beams 45, 46 simultaneously move apart or depending upon the direction of rotation of the shaft 49, move together. This construction enables the user to simultaneously move both of the stops 43, 44 either together or apart at the same speed and to thus define the length of a slot 69 that is to be cut in the work piece 40.

Figure 5:
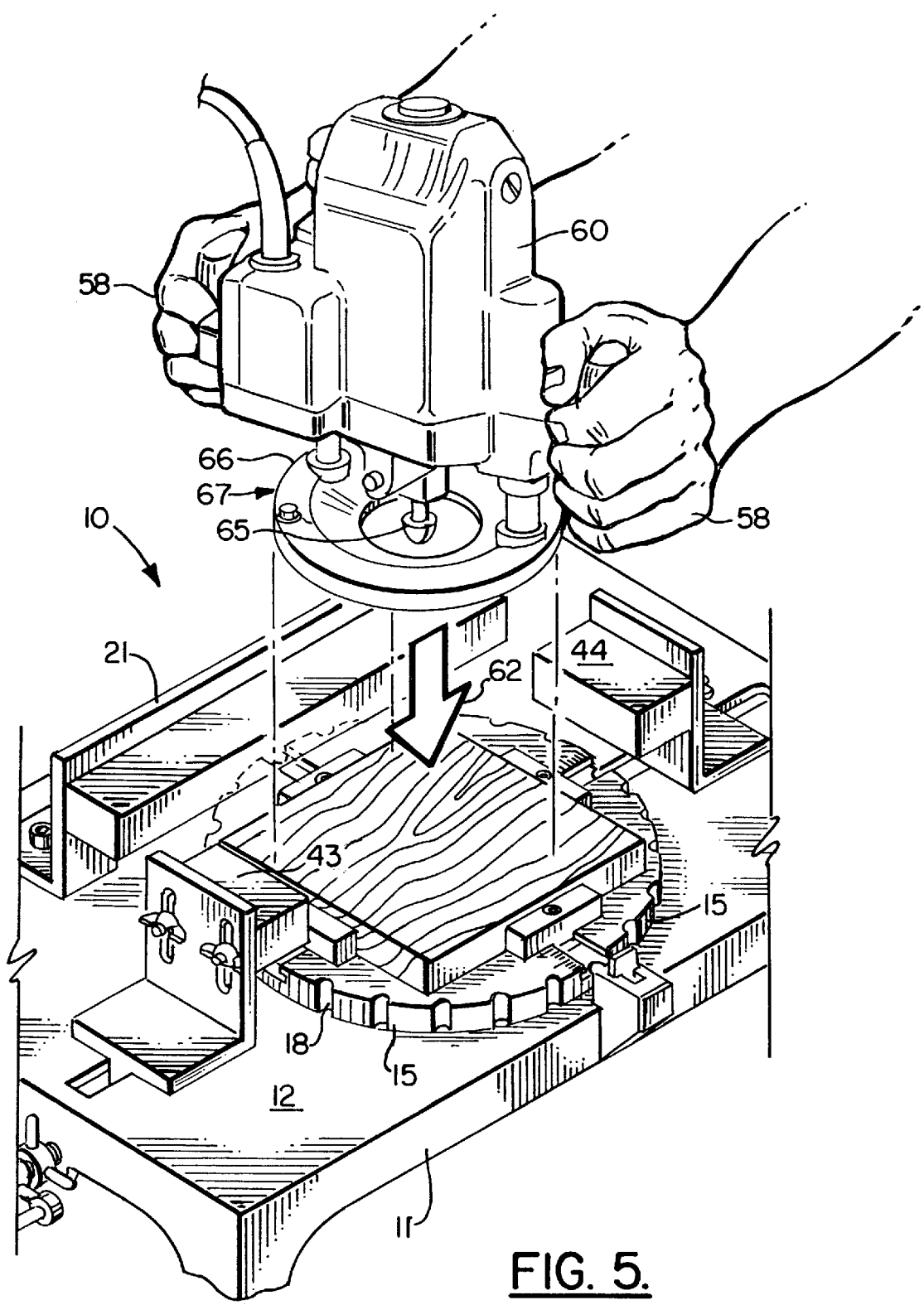
FIG. 5 is a partial perspective view of the preferred embodiment of the apparatus of the present invention showing the attachment of a router to the apparatus prior to cutting the work piece.
Figure 9:
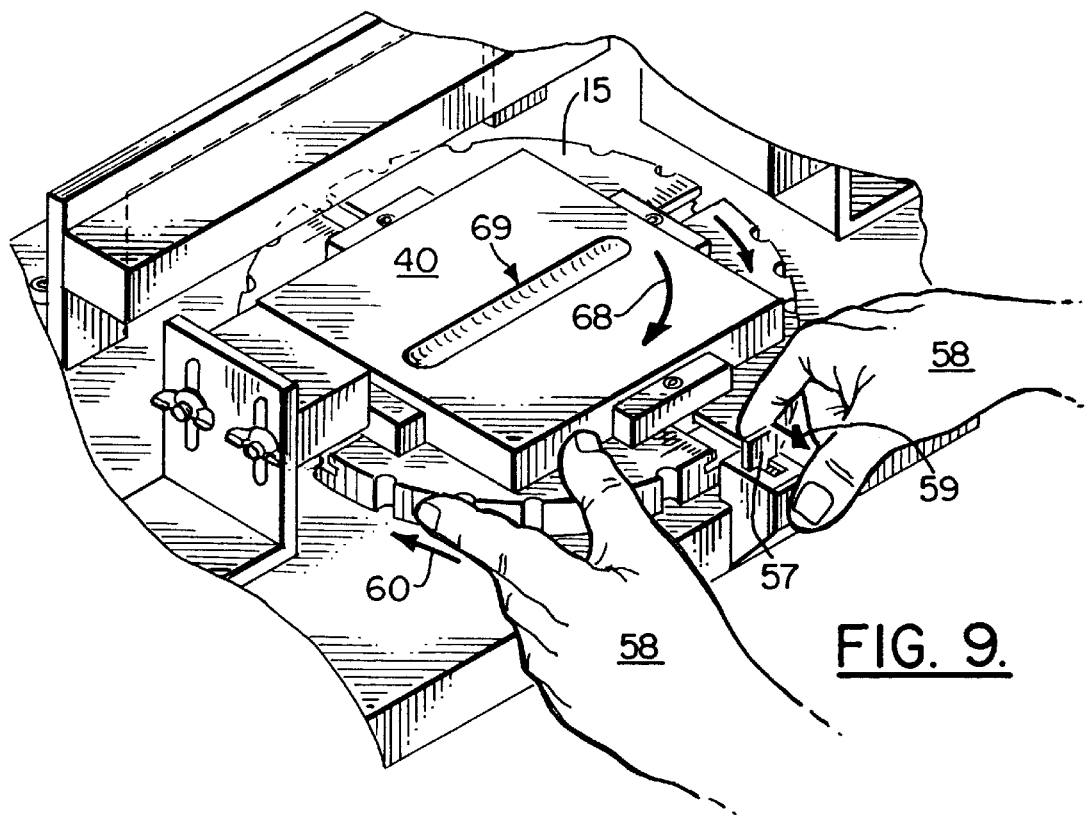
FIG. 9 is perspective fragmentary view of the preferred embodiment of the apparatus of the present invention shown after the formation of one groove of the flower patter in the work piece.
Figure 10:
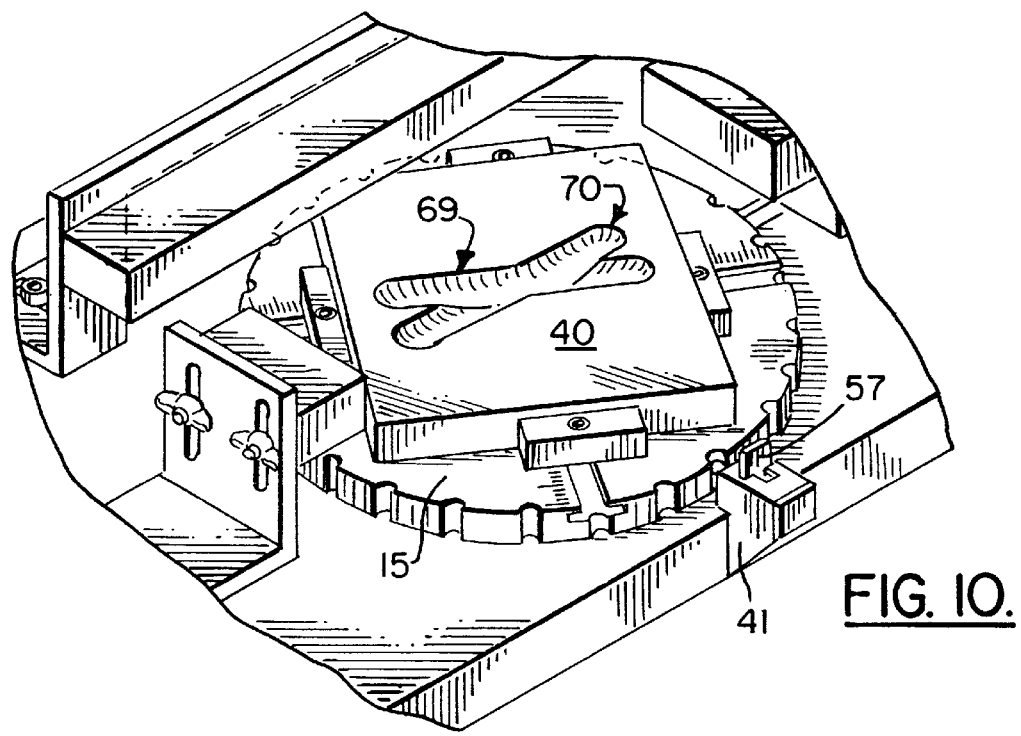
FIG. 10 perspective fragmentary view of the preferred embodiment of the apparatus of the present invention shown after the formation after a second groove of the flower patter in the work piece.

In order to form a rosette or flower pattern on the work piece 40, the user first selects and angular position of turntable 15 by locking the detent locking pin 42 into one of the selected grooves 18. As shown in FIG. 5, the router 60 is then lowered by the users hands 58 onto the work piece 40 as shown by arrow 62. Detent locking mechanism 41 provides a grip 57 that can be moved by the user's hands 58 (see FIG. 9) as indicated arrow 59 after the router 60 has cut a groove such as 69 in FIG. 9. Arrow 68 indicates a rotation of the table 15 into a second angular orientation so that a second groove 70 can be cut as shown in FIG. 10.

In FIG. 8, the router 60 is moved in the direction of arrows 64 and 65 in order to cut an elongated groove 69. The router 60 includes a router blade 65 that can be shaped to provide a desired pattern of the router as cut into the wood work piece 40. Router 60 also has a router flange 66 with a periphery 67 that engages fence 21 at beam 24 and the stops as shown in FIG. 8. The router 60 is shown in phantom lines in different positions as it moves from left to right in between the stops 43 and 44 which contact the periphery 67 of router flange 66 during cutting. At the same time, the router flange 66 periphery 67 engages beam 24. This construction enables a single cut to be made for forming two simultaneous petals of the rosette design because the router travels fully across the center of rotation 17 of turntable 15. The router blade 65 thus travels to the ends of groove 69 as shown in FIG. 8 indicated by arrows 63 and 64.

In FIG. 6, a completed flower pattern 75 is shown. In FIG. 6, the design has been completed by forming six different cuts indicated by grooves 69–74, each of the grooves forming two petals of the flower pattern. Thus for example the groove 74 includes petals 74A and 74B.

In FIGS. 11–20, a second embodiment of the apparatus of the present invention is shown, designated generally by the numeral 80. As with the first embodiment of FIGS. 1–10, the apparatus 80 has a frame 11, work surface 12, feet 13, turn table 15, hub 16, grooves 18 at periphery 19, shaft 49, crank 50 and lock wheel 51. A pair of opposed router stops 81, 82 are mounted to shaft 49. As crank 50 is rotated, stops 81, 82 move together or apart depending upon the direction of rotation of crank 50. Stops 81, 82 can be fitted with filler blocks 83 and beams 85.

Figure 11:
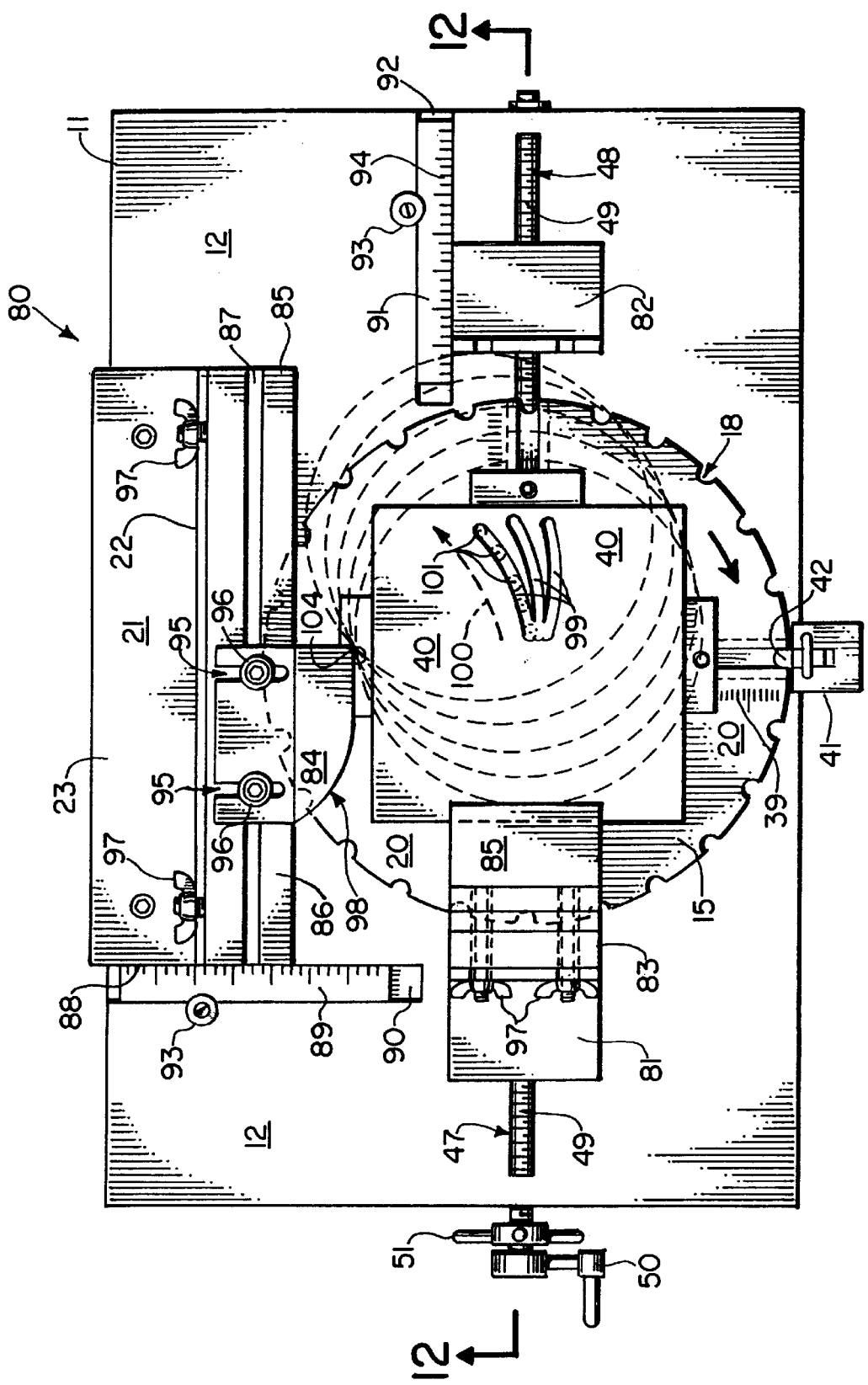
FIG. 11 is a plan view of an alternate embodiment of the apparatus of the present invention.
Figure 12:
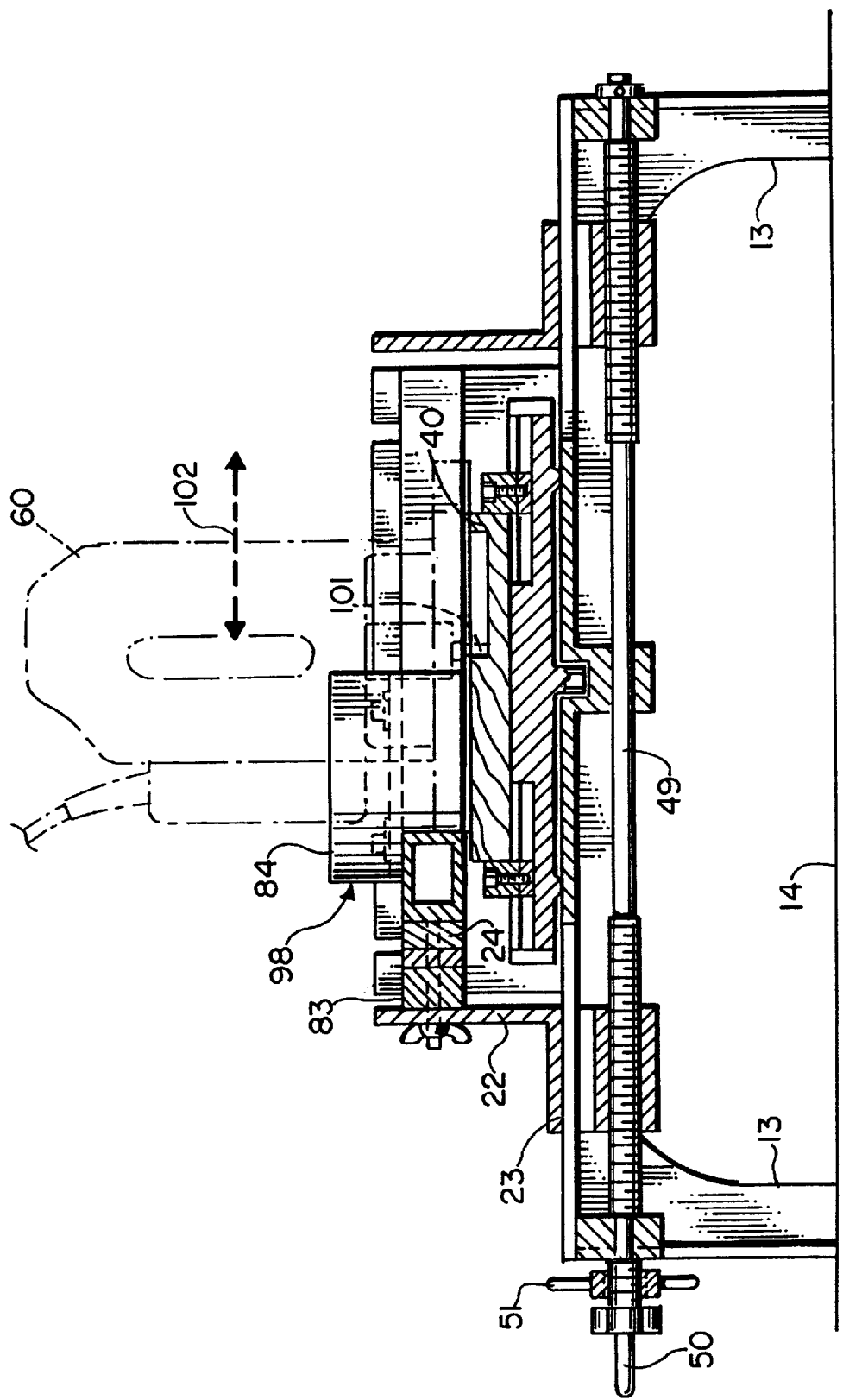
FIG. 12 is a sectional view taken along lines 12—12 of FIG. 11.

In FIG. 11, stop 81 has a filler block 83. It will be appreciated that by fitting filler blocks 83 of different thicknesses to a selected stop 81 or 82, different paths are traveled by router 60 to form different shapes of a rosette design. Yet other different shapes can be obtained when a filer block 83 is used in combination with a selected, specially shaped fence block 84. Fence 21 has flanges 22, 23 and beam 85. Beam 85 has upper surface 86 with slot 87.

The alternate embodiment of the apparatus of the present invention 80 enables the user to cut rosette shapes that differ from one work piece 40 to the next by interchanging filler blocks 83 and fence blocks 84. Examples are shown in FIGS. 11, 13, 14, 15 and 17–19. Filler blocks 83 can be of different dimensions such as for example different thicknesses so that the beam 85 is closer to or farther away from the work piece 40 as desired by the user. Different shaped cuts can be made by router 60 when the fence block 84 is placed in different positions relative to the work piece or faced in different directions. For example, in FIG. 11, the fence block 84 has curved surface 98 to the left and vertical edge 104 to the right. In FIG. 11, the router 60 begins a cutting position by resting against beam 85 and moving in the direction of arrow 100 while engaging vertical edge 104 of fence block 84. This configuration produces cuts 99 as the router bit 101 tracks arrow 100. Different positions and shapes for the cuts 99 can be obtained by varying the position of fence block 84 and or beam 85 relative to frame 11. Measurements of the selected position can be achieved using guides 89 and 91. Guide 89 provides indicia 88 for indicating position such as in millimeters or inches. Guide 87 rests in slot 90 in work surface 12. Similarly, guide 91 provides indicia 94. Guide 91 rests in slot 92. Each of the guides 89, 91 can be fixed in a desired position using set screws 93. For example, the guides 89 and 91 can be calibrated relative to the center of a work piece 40 or relative to the center of work surface 12.

Figure 13:
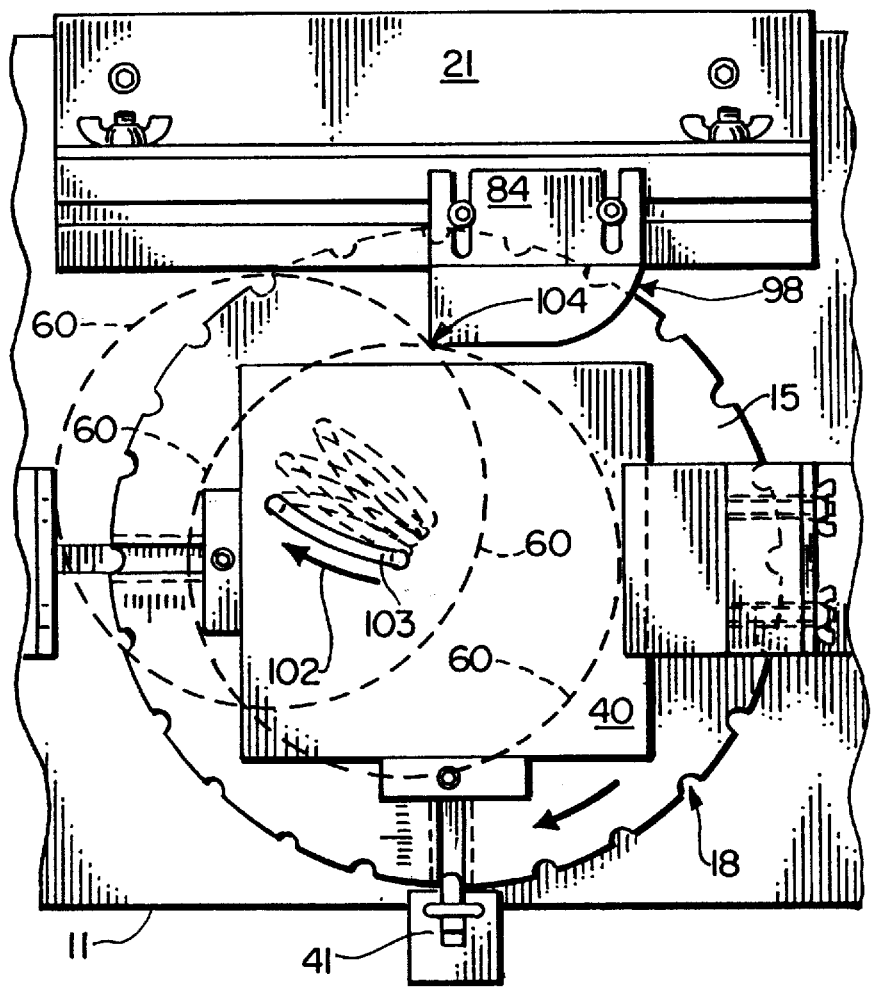
FIG. 13 is a fragmentary plan view of an alternate embodiment of the apparatus of the present invention.
Figure 14:
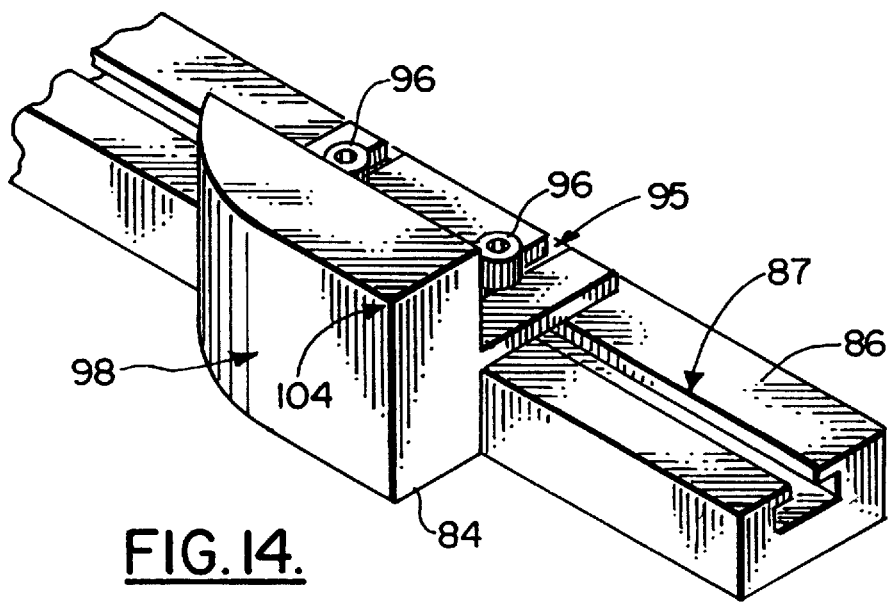
FIG. 14 is a fragmentary, perspective view of the alternate embodiment of FIG. 13.
Figure 16:
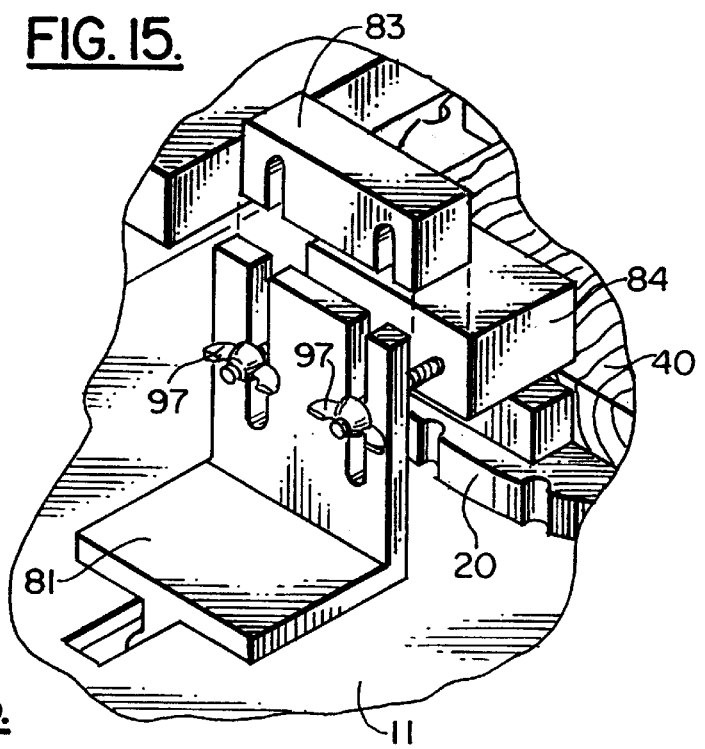
FIG. 16 is a fragmentary perspective view of the alternate embodiment of the apparatus of the present invention.

In FIG. 11, fence block 84 is oriented with vertical edge 104 to the right and curved surface 98 to the left. In FIG. 13, a different orientation is provided. In FIG. 13, vertical edge 104 is to the left and curved surface 98 is to the right. Slots 95 on fence block 84 enable it to be switched from the position shown in FIG. 11 to the position shown in FIG. 13. After the selected position is achieved, set screws 96 can be tightened to fix the position of fence block 84. Similarly, wing nuts or like bolted connections can be used to tighten a selected filler block 83 in position next to beam 85 as shown in FIG. 16. In the configuration of FIG. 13, the router 60 begins a cut by resting against router stop 82 and fence block 84. The router 60 moves in the direction of arrow 102 to form cut 103. In FIG. 13, the router 60 defines a curved path for making the cut 103 by resting against the vertical edge 104 of fence block 84 as it moves in the direction of arrow 102.

Figure 15:
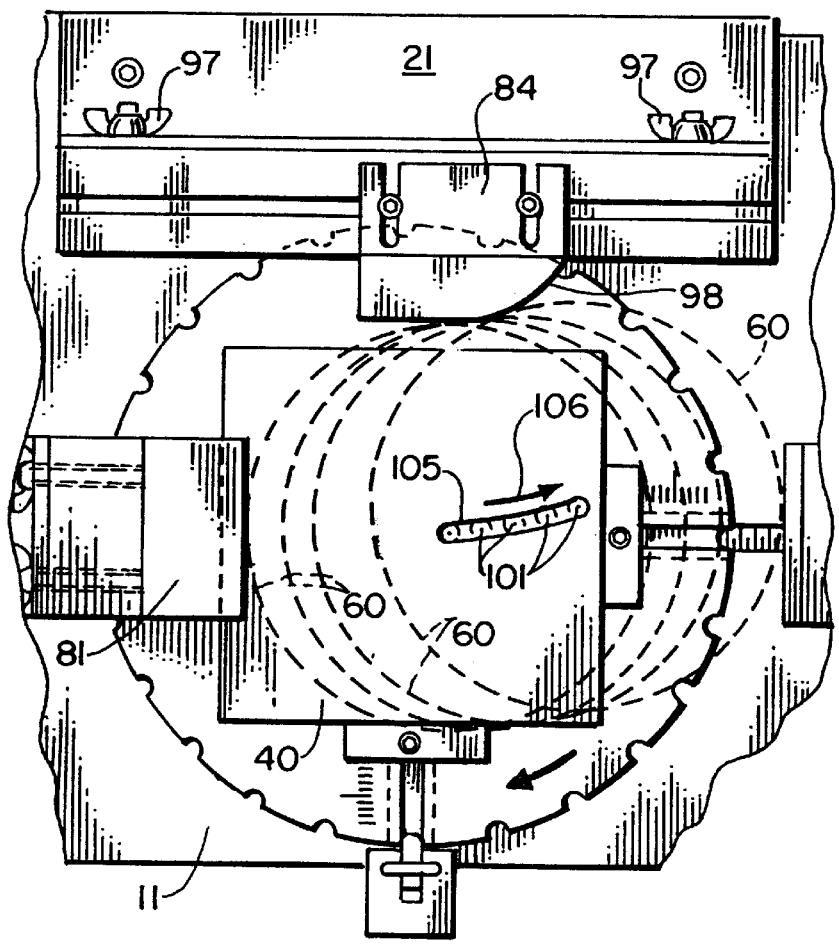
FIG. 15 is a top, plan view of the alternate embodiment of the apparatus of the present invention.

Yet another method of forming a cut using the apparatus 80 of the present invention is shown in FIG. 15. In FIG. 15, the router 60 begins by resting against router stop 81 and fence block 84. In FIG. 15, the router 60 tracks along the curved surface 98 of fence block 84 as shown in FIG. 15. A cut 105 is formed in the direction of arrow 106 by router bit 101.

Figure 17:
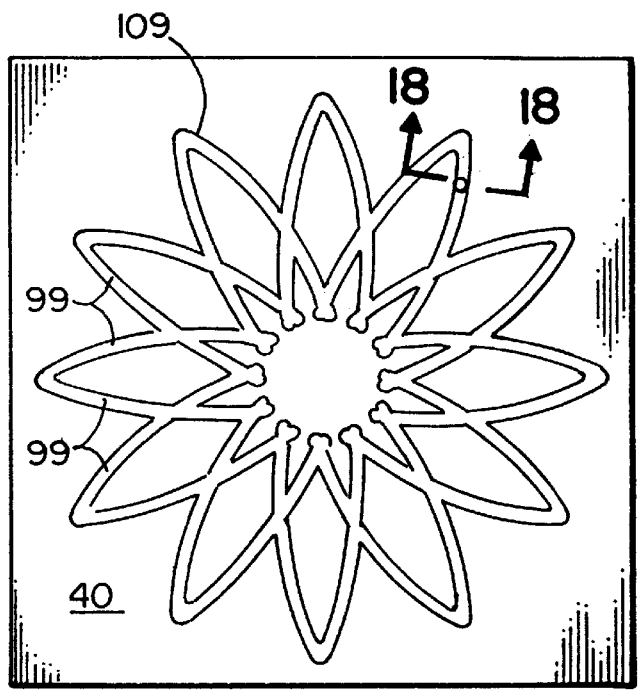
FIG. 17 is a plan view of a rosette that has been cut using the method and apparatus of the present invention.
Figure 18:
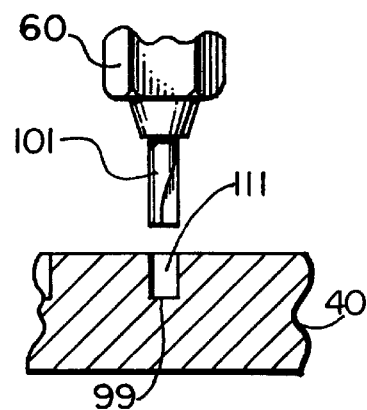
FIG. 18 is a sectional view taken along lines 18—18 of FIG. 17.
Figure 19:
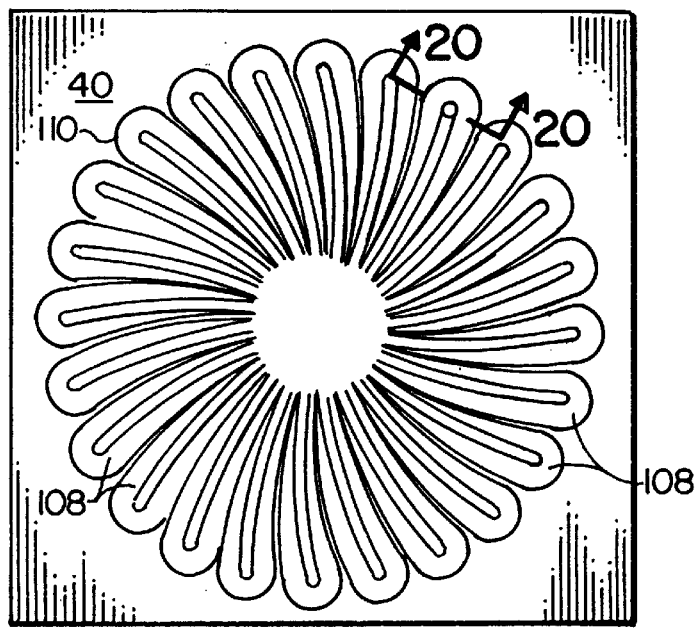
FIG. 19 is a plan view of another rosette cut using the method and apparatus of the present invention.
Figure 20:
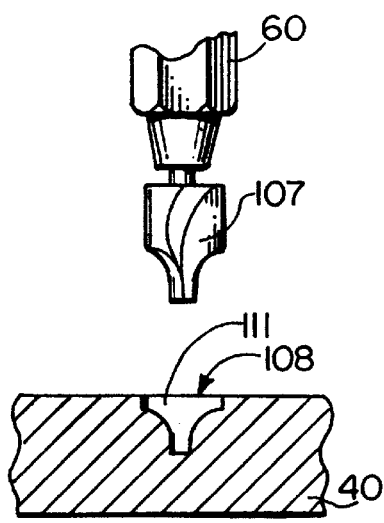
FIG. 20 is a sectional view taken along lines 20—20 of FIG. 19.

In FIGS. 17–20, rosettes are shown that are formed using the apparatus 80 of the present invention. In FIG. 17, cuts 99 have been formed in work piece 40 to form rosette 109. In FIG. 17, the router 60 has been provided with a bit 101 that is generally cylindrically shaped to form the cut 99. It should be understood that the work piece 40 in FIGS. 17 and 18 can be a synthetic material such as Corian® or like synthetic material that is used commonly in kitchens and in bathrooms. The cut 99 can be filled with a filler glue material that is of a color that is different than the color of the work piece 40. After sanding the work piece and filler/glue 111, an inlaid design is achieved. In FIGS. 19 and 20, router bit 107 provides a cut 108 that is much wider than the cut formed in FIGS. 17 and 18. Again, the work piece 40 in FIGS. 19 and 20 can be a synthetic such as Corian®. By using the bit 107, a much wider cut 108 is provided. This produces the spiral design shown. The arrangement in FIG. 13 provides the rosette design shown in FIG. 17. The configuration of FIG. 15 provides the rosette design of FIG. 19.

The following table lists the parts numbers and parts descriptions as used herein and in the drawings attached hereto.

PARTS LIST

| Part Number | Description |
|---|---|
| 10 | flower like rosette cutting apparatus |
| 11 | frame |
| 12 | work surface |
| 13 | foot |
| 14 | underlying surface |
| 15 | turn table |
| 16 | hub |
| 17 | center of rotation |
| 18 | groove |
| 19 | periphery |
| 20 | upper surface |
| 21 | fence |
| 22 | flange |
| 23 | flange |
| 24 | beam |
| 25 | bolted connection |
| 26 | bolted connection |
| 27 | slot |
| 28 | arrow |
| 29 | arrow |
| 30 | clamp |
| 31 | clamp |
| 32 | clamp |
| 33 | clamp |
| 34 | slot |
| 35 | slot |
| 36 | slot |
| 37 | slot |
| 38 | bolted connection |
| 39 | scale |
| 40 | work piece |
| 41 | detent lock |
| 42 | locking pin |
| 43 | router stop |
| 44 | router stop |
| 45 | flanged bean |
| 46 | flanged beam |
| 47 | slot |
| 48 | slot |
| 49 | threaded shaft |
| 50 | crank |
| 51 | lock wheel |
| 52 | bolted connection |
| 53 | bolted connection |
| 54 | internally threaded sleeve |
| 55 | internally threaded sleeve |
| 56 | shaft support bearing |
| 57 | grip |
| 58 | user's hand |
| 59 | arrow |
| 60 | arrow |
| 61 | arrow |
| 62 | arrow |
| 63 | arrow |
| 64 | arrow |
| 65 | router blade |
| 66 | router flange |
| 67 | periphery |
| 68 | arrow |
| 69 | groove |
| 70 | groove |
| 71 | groove |
| 72 | groove |
| 73 | groove |
| 74 | groove |
| 75 | flower pattern |
| 80 | cutting apparatus |
| 81 | router stop |
| 82 | router stop |
| 83 | filler block |
| 84 | fence block |
| 85 | beam |
| 86 | upper surface |
| 87 | slot |
| 88 | indicia |
| 89 | guide |
| 90 | slot |
| 91 | guide |
| 92 | slot |
| 93 | set screw |
| 94 | indicia |
| 95 | slot |
| 96 | set screw |
| 97 | wing nut |
| 98 | curved surface |
| 99 | cut |
| 100 | arrow |
| 101 | router bit |
| 102 | arrow |
| 103 | cut |
| 104 | vertical edge |
| 105 | cut |
| 106 | arrow |
| 107 | router bit |
| 108 | cut |
| 109 | rosette |
| 110 | rosette |
| 111 | filler |

The foregoing embodiments are presented by way of example only; the scope of the present invention is to be limited only by the following claims.

What is claimed is:

1. A router guide apparatus for use in forming an inlaid rosette design in a synthetic work piece, comprising;
    a) a frame having a work surface;
    b) a wheel rotatably mounted upon the work surface, the wheel having a center of rotation and a holder;
    c) a work piece supported by holder;
    d) the wheel having a plurality of position stops thereon;
    e) the frame including an adjustable guide for holding and tracking a router with a cutting blade;
    f) the frame including stops for limiting movement of the router during use;
    g) the guide and stops being configured to enable the cutting blade to cut two petals of the rosette in a single pass;
    h) the wheel being affixable into multiple angular positions relative to the guide so that multiple cuts can be made at different angular orientations relative to one another; and
    i) wherein the workpiece is a synthetic material that will accept a filler that fills and colors the cuts.

2. The router guide apparatus of claim 1 wherein the positions include grooves on the wheel.

3. The router guide apparatus of claim 1 wherein the positions include grooves on the wheel.

4. The router guide apparatus of claim 1 wherein the wheel carries multiple vise members for holding the work piece.

5. The router guide apparatus of claim 1 further comprising a lock for holding the wheel in a selected of the position stops.

6. The router guide apparatus of claim 2 further comprising a lock for holding the wheel in a selected of the position stops.

7. The router guide apparatus of claim 3 further comprising a lock for holding the wheel in a selected of the position stops.

8. The router guide apparatus of claim 1 wherein the guides includes adjustable stops movably positioned on the frame.

9. The router guide apparatus of claim 1 wherein the guide includes a fence that extends along one side of the wheel, offset from the center of rotation of the wheel.

10. The router guide apparatus of claim 9 wherein the fence is movably adjustable relative to the frame.

11. The router guide apparatus of claim 10 wherein the fence includes vertically adjustable beam portion.

12. The router guide apparatus of claim 1 wherein there are at least six position stops.

13. The router guide apparatus of claim 1 wherein there are at least twelve position stops.

14. The router guide apparatus of claim 1 wherein there are between six and twenty-four position stops.

15. The router guide apparatus of claim 1 wherein the guide includes opposed stops that are simultaneously moveable toward the wheel.

16. The router guide apparatus of claim 1 wherein the guide includes opposed stops that are simultaneously moveable away from the wheel.

17. The router guide apparatus of claim 1 wherein the wheel carries a plurality of at least two vise members for holding the work piece.

18. The router guide apparatus of claim 1 wherein the wheel is affixable relative to the frame with a detent licking mechanism.

19. The router guide apparatus of claim 1 further comprising a lock for simultaneously locking both of the stops relative to the frame.

20. A router guide apparatus for use in forming rosette designs in a work piece; comprising;
   a) a frame having a work surface;
   b) a wheel rotatably mounted upon the work surface, the wheel having a center of rotation and a holder for supporting the work piece;
   c) the wheel having a plurality of position stops thereon;
   d) the frame including an adjustable guide for holding and tracking a router with a cutting blade;
   e) the frame including stops for limiting movement of the router during use;
   f) the guide and stops being configured to enable the cutting blade to cut two petals of the rosette in a single pass;
   g) the wheel being affixable into multiple angular positions that are spaced circumferentially apart substantially the same angular degree measurement so that multiple cuts can be made at angular orientations that vary from a first cut by a multiple of the same angular measurement; and
   h) one or more inserts that are removably attachable to the combination of frame stops and guide for varying the track of the router during use relative to the frame.

21. The router guide apparatus of claim 20 wherein the angular measurement is 15 degrees.

22. The router guide apparatus of claim 20 wherein the position stops are 15 degrees apart.

23. The router guide apparatus of claim 20 wherein the position stops are 30 degrees apart.

24. The router guide apparatus of claim 20 wherein the position stops are 60 degrees apart.

25. The router guide apparatus of claim 1 wherein each stop is positioned on opposite sides of the wheel so that the router blade can cut through the center of the rotation of the wheel and on both sides thereof in a single cut.

26. The router guide apparatus of claim 1 wherein the guide is configured to guide the router to cut grooves in the work piece that overlap one another.

27. The router guide apparatus of claim 20 wherein the guide is configured to guide the router to cut grooves in the work piece that overlap one another.

28. A method of forming an inlaid rosette design in a work piece comprising the steps of:
   a) providing a router frame with a rotatable member thereon that supports the work piece;
   b) forming a cut in the work piece by moving the router relative to the frame;
   c) moving the rotating member and repeating step "b";
   d) repeating steps "c" and "d" until a rosette design is formed; and
   e) filling the cuts with a solid material that is of a different color than the work piece.

29. The method of claim 28 wherein the cuts follow a generally curved path.

30. The method of claim 28 wherein each cut defines about one half of a rosette petal.

31. The method of claim 28 wherein there are adjustable guides on the frame that define the path tracked by the router.

32. The method of claim 31 wherein the track of the router can be varied by changing position of a guide or by adding another guide.

* * * * *